3,296,224
POLYBENZOTHIAZOLE PREPARATION
Philip E. Brumfield, Pittsburgh, Pa., assignor to Koppers Company, Inc., a corporation of Delaware
Filed Mar. 29, 1963, Ser. No. 269,075
5 Claims. (Cl. 260—79.7)

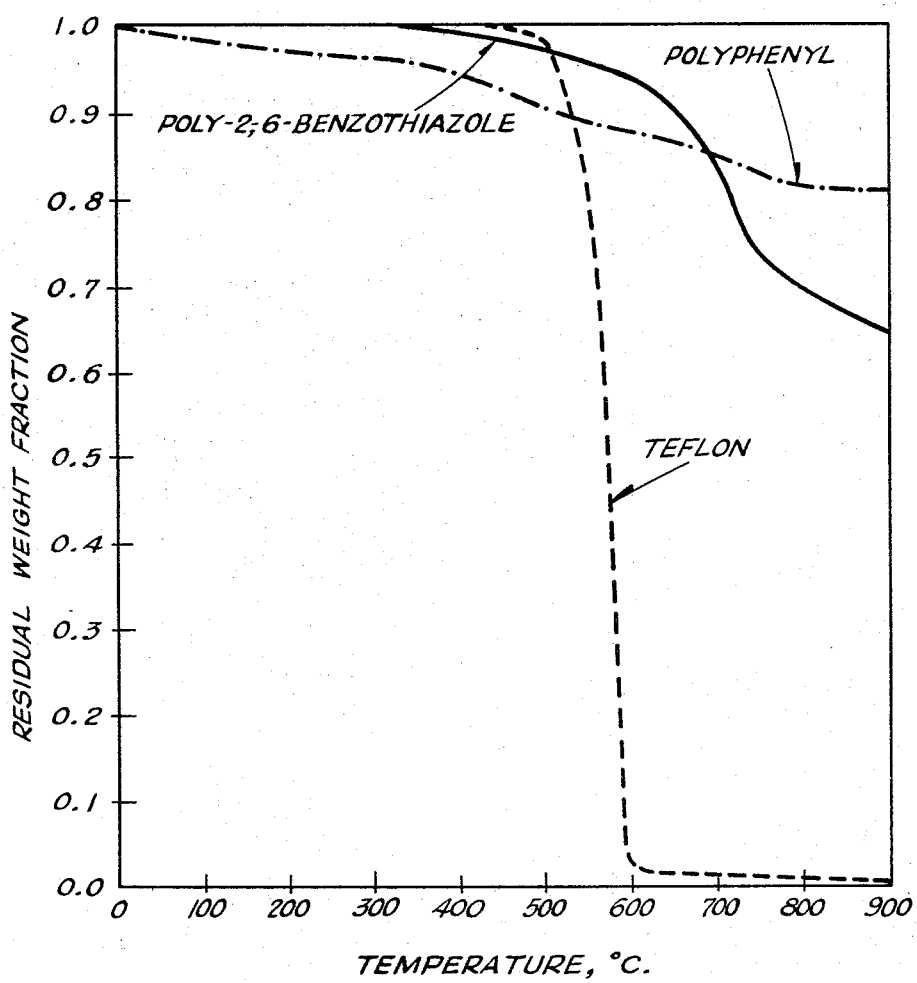

This invention relates to the preparation of heat-resistant polymers containing a benzothiazole nucleus. In one specific aspect, it relates to heat-resistant polymers prepared by the reaction of sulfur with p-toluidine or one of its simple sulfur condensation products.

The recent emphasis on space exploration has created a need for materials having greater thermal and oxidative stability. There has been a continued search for new heat-stable polymers suitable as construction materials for rocket nose cones and various other parts of space craft. I have discovered polymers having unexpectedly high oxidative and thermal stability made by the reaction of sulfur and p-toluidine, or one of its simple sulfur condensation products. My polymers, which are characterized by repeating benzothiazole units, are useful in various commercial and military applications wherein thermal stability and shock resistance are particular requirements.

The reaction of p-toluidine with sulfur is not new. H. E. Fierz-David and L. Blangey in the Fundamental Processes of Dye Chemistry, 1949, p. 332, describe the fusion of p-toluidine and sulfur at temperatures beginning at 180° C. and, at a slow rate of increase, ending at 220° C. The resulting product is a mixture of 6-methyl-2-(4-aminophenyl)benzothiazole, commonly called dehydrothio-p-toluidine, and 2'-(p-aminophenyl)-6-methyl-2,6-bi-benzothiazole, known in the art as Primuline base. No high polymers can be produced using the method of Fierz-David.

Polymers containing benzothiazole units are described in Morton et al. U.S. 3,047,543. The polymers of Morton are useful as adhesive components and must be made from a critical mixture of monomeric isomers in order to obtain a suitable reaction and a polymer of the desired properties. Morton et al. describe the reaction of pure p-toluidine and sulfur to give products, which, when heated above 105° C. were found to be greasy or buttery in nature, incapable of being drawn out into a filament and otherwise non-resinous. The useful products of Morton et al. are made by reacting mixed toluidine isomers and sulfur to give an intermediate stage resin. A heat-stable resin can be produced from this material only by subjecting it to a further heating cycle at high temperatures.

Surprisingly, by my novel method, I am able to obtain in one step a heat-stable polybenzothiazole directly from p-toluidine. Since my polymer is made from the pure para-isomer, its heat stability, particularly in the temperature ranges approaching 1000° C., is greater than that of the polymers of Morton et al.

It is, therefore, an object of the present invention to provide a novel method of making a polybenzothiazole of unexpectedly high thermal, oxidative ablative, and hydrolytic stability.

In accordance with the invention, a polybenzothiazole, exhibiting excellent thermal stability at temperatures exceeding 600° C. is made by reacting, at a temperature of 200–400° C. an amino compound of the formula:

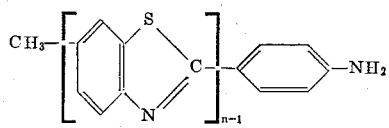

wherein $n$ has a value of 1–3, with 3.5–6.5 moles of sulfur per mole of amino compound. The reaction takes place in the presence of an anhydrous mixture of sodium and potassium polysulfides; the mixture of polysulfides comprising 0.5–2 parts by weight of sodium polysulfide per weight part of potassium polysulfide and being present in an amount of 2–20 parts by weight per weight part of the amino compound. The polybenzothiazole thus formed is separated from the molten polysulfides by conventional techniques.

The basic starting materials for use in the process of the invention are sulfur and p-toluidine, dehydrothio-p-toluidine, or Primuline base. The p-toluidine, or one of the above condensation products, can be substituted, provided that it contains no electrophilic substituents and at least one free position on the ring next to the amino group.

Polymerization is accomplished by heating the sulfur and amino compound in the molten polysulfide mixture at a temperature of 200–400° C. Below about 200° C. polymerization does not occur at useful rates. No advantage is seen in using temperatures above 400° C., and at much higher temperatures degradative side reactions occur. A preferred temperature range is between 230 and 280° C.

Polymerization is generally conducted in an inert atmosphere, e.g. under a blanket of nitrogen, argon, or hydrogen, at the required temperatures. The use of an inert atmosphere is convenient to prevent oxidation of the sulfur in the reaction mixture.

Polymerization is preferably conducted at atmospheric pressure, although higher or lower pressures can be used, even in the same run, if desired.

The mole ratio of sulfur to amino compound is preferably about 3.5–4:1 in order to obtain the highest possible yield of linear polymer. If lesser amounts of sulfur are used, the yield of linear polymer is diminished. The presence of sulfur in amounts greater than a mole ratio of 6.5:1 (sulfur to amino compound) is undesirable because the excess sulfur results in a polymer which is too highly cross-linked, giving only an infusible, intractable mass as an ultimate product. Products which are only partially cross-linked, i.e. those made using 4.5–6.5 moles of sulfur per mole of amino compound, can be worked and thus are still useful in the preparation of thermally-stable molded objects.

It is essential according to the invention to conduct the reaction between the sulfur and the amino compound in the presence of an anhydrous molten mixture of sodium and potassium polysulfides. Since lower melting mixtures provide a more fluid reaction medium, it is desirable to choose a ratio of sodium polysulfide to potassium polysulfide approximating the eutectic mixture. Conveniently, the weight ratio of sodium polysulfide, e.g. sodium tetrasulfide, to potassium polysulfide, e.g. potassium pentasulfide, can range between 0.5–2 parts by weight sodium polysulfide for each weight part of potassium polysulfide. A preferred reaction medium is one weight part sodium tetrasulfide per part potassium pentasulfide. The polysulfides cannot be used in their hydrated form because the presence of water inhibits the progress of the reaction.

The molten mixture of polysulfides used as a reaction medium in accordance with the invention should be present in an amount ranging between 2 and 20 parts by weight of the mixed polysulfides per part of amino compound. If less than two parts of the mixed polysulfides is present, the reaction cannot be pushed to completion and the high polymers of the invention are not obtained. The use of too large an amount of the mixed polysulfides is unattractive from an economic standpoint because of the recovery problems involved. Preferably, the reaction is run in the presence of 2–5 weight parts mixed polysulfides per part of amino compound.

The reaction is allowed to proceed for a period of 5–20 hours, preferably 8–10 hours. Generally, at least five hours are required to complete the reaction and beyond about twenty hours no further condensation is obtained.

Upon completion of the reaction, the polybenzothiazole is separated from the molten polysulfides by conventional means. If recovery of the polysulfide melt is not necessary, separation can be accomplished simply by drowning the mass in water. If desired, the polysulfides can be separated by extraction with alcohol and recovered for reuse in subsequent runs.

Referring now to the drawing, the graph shown therein dramatically illustrates the excellent thermal stability of polybenzothiazoles made by my novel method. The graph is a thermogravimetric analysis curve obtained by plotting the residual weight fraction of polymer (obtained by thermogravimetric analysis) against temperatures in ° C. The three curves present a comparison between poly-2,6-benzothiazole (obtained as described in Example II hereafter), polyphenyl, and "Teflon" (polytetrafluoroethylene). It is seen from the graph that the polymer obtained by the method of the invention is superior in its heat stability to polyphenyl at temperatures up to 700° C. and superior to "Teflon" at practically all temperatures.

The polymers of the invention have been shown by infrared absorption to be substantially free of amino groups. Thus, the polymers are truly polybenzothiazoles and not simply sulfide-linked polymers. It is seen from the examples that the use of m-toluidine, rather than p-toluidine, results in a sulfide-linked polymer which lacks the excellent thermal stability of the polybenzothiazole.

The polymer obtained by the method of the invention is soluble in concentrated sulfuric acid (25° C.), but insoluble in formic acid (100° C.), hexachlorobenzene (240° C.), dimethylsulfoxide (170° C.), and 2-phenylbenzothiazole (270° C.). Examination of the polymer by X-ray diffraction indicated a high degree of crystallinity (65–85%), four large angular deflections being obtained in the range for organic polymers with no broad pattern evident, indicating appreciable amorphous character. The molecular weight of the polymer, as indicated by non-aqueous titration methods, is in excess of 16,000.

Heat-resistant objects are made from the polymer by compression molding in a heated mold under pressures of, e.g. 10–24 tons. If desired, the heat stability of the polymer can be increaserd by compression molding to the desired shape in the presence of additional sulfur to cause in situ cross-linking of the polymer, thus rendering it infusible.

My invention is further illustrated by the following examples:

EXAMPLE I

A mixture of anhydrous potassium pentasulfide (30.9 g.) and anhydrous sodium tetrasulfide (31.9 g.) was heated and stirred in a nitrogen atmosphere; the orange-brown melt was viscous at 130° C. and fluid at 200° C. Dehydrothio-p-toluidine (10.0 g.) and sulfur (6.0 g.) were added to the melt at 160° C. and the mixture was then heated to 200–260° C. for eight hours. Hydrogen sulfide evolved and the mixture became black and viscous. After being cooled to 150° C., the black tar was scraped into 600 ml. of water. The aqueous suspension was heated to 90° C. and filtered; the resulting filter cake separating as a brown powder. This product was slurried with various solvents at reflux, including benzene, isoamyl alcohol, dimethylformamide and pyridine, in each case followed by hot filtration. The vacuum dried brown powder amounted to 10.4 g., a quantitative recovery of a polybenzothiazole.

EXAMPLE II

The procedure was repeated, using anhydrous sodium tetrasulfide (135.2 g.), anhydrous potassium pentasulfide (128.8 g.), sulfur (52.2 g.) and commercially available Primuline base (109.8 g.). In warming the reaction mixture (fluid formed at 135° C.), a brown solution formed at 200° C., and at 233° C., liquid was observed collecting in the Dry Ice trap (apparently hydrogen sulfide). The mixture was stirred at 243–285° C. for nine hours. The black, viscous mixture solidified upon cooling. Absolute ethanol was then added at about 120° C. The mixture was extracted repeatedly with portions of boiling ethanol to leach out the alkali polysulfides. The Dry Ice trap from the reaction was found to contain 12.1 g. of hydrogen sulfide. The brown solid was ground fine and slurried repeatedly with pyridine at reflux and with hot water. The vacuum dried brown powder amounted to 117.6 g., a quantitative recovery of a polybenzothiazole.

EXAMPLE III

The products of Examples I and II were examined to determine their properties. Both polymers showed the following typical elemental analysis:

| | Percent | | | | |
|---|---|---|---|---|---|
| | C | H | N | S | Total |
| Found | 60.16 | 2.61 | 9.31 | 27.82 | 99.90 |
| Calc'd: (a) Infinite $n$ [1] | 63.13 | 2.27 | 10.52 | 24.08 | 100.00 |
| (b) $n=10$ with 3 added sulfur atoms ($C_{77}H_{39}N_{11}S_{13}$) | 60.29 | 2.56 | 10.03 | 27.12 | 100.00 |

[1] $n$ = degree of polymerization.

The infrared absorption curve for both polymers showed the absence of (—NH) vibration at $3.0\mu$ and presence of thiazole ring vibration at $6.3\mu$ and $10.3\mu$ and 1,2,4-phenyl substitution vibration at $12.2\mu$.

Samples of both polymers heated as brown powder on a spatula darkened as the spatula approached red heat. The powders were heated until a red glow was obtained and thereafter cooled. The cooled black powders showed infrared absorption figures similar to the original powders, although less distinct.

A non-aqueous titration (perchloric acid is acetic acid) for both polymers gave a value of N as less than 0.1%. Assuming this value to be accurate, the indicated molecular weight on end group basis would be over 16,000. A Vicat softening point determination indicated that the polymer begins to show slight softening at above 400° C.

A three-gram sample of the product of Example II was placed in a cylindrical mold, ⅞ in. diameter, and compressed under two tons pressure while the mold was heated to 600° F. There was obtained a brown disc, 3/16 in. thick, having a Barcol hardness of about 60.

EXAMPLE IV

A melt of sodium tetrasulfide (28.3 g.) and potassium pentasulfide (21.2 g.) was heated to 210° C. under a nitrogen atmosphere. After cooling to 160° C., p-toluidine (10.7 g., 0.10 mole) and sulfur (11.2 g., 0.35 mole) were added. The mixture was stirred and heated to 194° C. The p-toluidine was imiscible with the polysulfide melt and partially sublimed in the reactor. As reaction progressed, the p-toluidine layer disappeared and a uniform dark brown tarry mixture formed. After six hours, the dark mixture became more viscous and the temperature began to rise in the reactor, from 208° C. to 220° C. in one hour. After a total heating time of 14.5 hours at a final reaction temperature of 259° C., the cooled mixture was stirred with warm water (600 ml.) and filtered. The cake was washed with two portions of hot ethanol (50 ml. each) and with two portions of carbon disufide (50 ml. each). The cake was then stirred in boiling pyridine (100 ml.) and filtered hot. After washing the cake with ethanol (50 ml.), the brown powder was vacuum dried (13.9 g. obtained, 13.3 g. theory). A sample of the product (3.00 g.) was stirred at 25° C. with concentrated sulfuric acid (250 ml.). The dark orange acid solution (filtered through an asbestos pad) was added to water to recover the soluble polymer (2.60 g.). The brown powder recovered had the infrared absorption expected for a polybenzothiazole (and was virtually the same as for the polymer before acid treatment). Attempted compression molding at 300° C. and 7,000 p.s.i.g. gave only partial fusion, indicating that more drastic molding conditions were required. A 0.5 percent solution of polymer in concentrated sulfuric acid tested for viscosity measurement gave an inherent viscosity of 0.17.

EXAMPLE V

The procedure of Example IV was repeated with m-toluidine (10.7 g., 0.10 mole), using a melt of sodium tetrasulfide (19.5 g.) and potassium pentasulfide (20.0 g.). In this case, the reaction temperature rose to 220° C. within two hours, so that the total reaction time was only seven hours, the final temperature rising to 260° C. The washed and dried brown polymeric material (16.6 g. obtained, 13.3 g. theory) had infrared absorption indicating appreciable —NH ($3\mu$) groups. An absorption at $10.3\mu$ had been observed by inspection of a large group of benzothiazole compounds with an aryl linkage at the 2-position. This strong absorption peak was found to be present in the polymers prepared from p-toluidine or its derivatives, but was possibly present only as a weak shoulder in the product from m-toluidine. Attempted compression molding at 300° C. and 7,000 p.s.i.g. yielded fused, dark, brittle mass. The polymer had very little solubility in concentrated sulfuric acid. The polymer, therefore, was not a polybenzothiazole, but a sulfide-linked polymer containing many free amino groups. Such a polymer lacks the excellent thermal stability of the polybenzothiazole.

I claim:
1. A method of making a polybenzothiazole exhibiting excellent thermal stability at temperatures exceeding 600° C. comprising reacting at a temperature of 200–400° C. an amino compound of the formula:

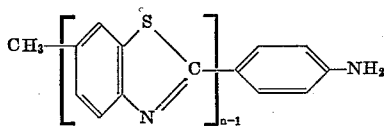

wherein $n$ has a value of 1–3, with 3.5 to 6.5 moles of sulfur per mole of said amino compound in the presence of an anhydrous mixture of sodium and potassium polysulfides, said mixture comprising 0.5–2 parts by weight sodium polysulfide per part potassium polysulfide and being present in an amount of 2–20 parts by weight per part of said amino compound, and separating the polybenzothiazole thus formed from the reaction mixture.

2. A method according to claim 1 wherein said compound is p-toluidine.
3. A method according to claim 1 wherein said compound is dehydrothio-p-toluidine.
4. A method according to claim 1 wherein said compound is Primuline base.
5. A method of making a polybenzothiazole exhibiting excellent thermal stability at temperatures exceeding 600° C. comprising reacting at a temperature of 230–280° C. an amino compound of the formula:

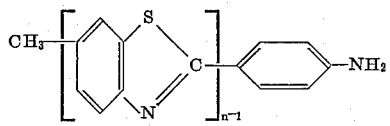

wherein $n$ has a value of 1–3, with 3.5 to 4.0 moles of sulfur per mole of said amino compound in the presence of an anhydrous mixture of sodium and potassium polysulfides, said mixture comprising substantially equal parts by weight sodium tetrasulfide per part of potassium pentasulfide and being present in an amount of 2–5 parts by weight per part of said amino compound, and separating the polybenzothiazole thus formed from the reaction mixture.

References Cited by the Examiner
UNITED STATES PATENTS
3,047,543  7/1962  Morton et al. _____ 260—79

JOSEPH L. SCHOFER, *Primary Examiner.*

J. F. McNALLY, *Assistant Examiner.*